United States Patent
Pineau et al.

(10) Patent No.: US 8,397,563 B2
(45) Date of Patent: Mar. 19, 2013

(54) AERONAUTICAL PROBE WITH INTEGRATED HEATER

(75) Inventors: Jean-Philippe Pineau, Landes le Gaulois (FR); Bernard Ledain, Sevres (FR)

(73) Assignee: Thales (FR)

( * ) Notice: Subject to any disclaimer, the term of this patent is extended or adjusted under 35 U.S.C. 154(b) by 270 days.

(21) Appl. No.: 12/745,556

(22) PCT Filed: Nov. 28, 2008

(86) PCT No.: PCT/EP2008/066446
§ 371 (c)(1),
(2), (4) Date: Oct. 19, 2010

(87) PCT Pub. No.: WO2009/068653
PCT Pub. Date: Jun. 4, 2009

(65) Prior Publication Data
US 2011/0036160 A1 Feb. 17, 2011

(30) Foreign Application Priority Data
Nov. 30, 2007 (FR) ...................................... 07 08398

(51) Int. Cl.
*G01P 13/00* (2006.01)

(52) U.S. Cl. .................... 73/170.02; 73/17.01

(58) Field of Classification Search .................. None
See application file for complete search history.

(56) References Cited

U.S. PATENT DOCUMENTS

| 4,121,088 | A | 10/1978 | Doremus et al. |
| 4,998,008 | A | 3/1991 | Menhardt |
| 5,003,295 | A * | 3/1991 | Kleven ........................ 340/581 |
| 6,196,066 | B1 * | 3/2001 | Barbier ........................ 73/456 |
| 6,591,696 | B2 * | 7/2003 | Bachinski ................. 73/861.65 |
| 6,817,240 | B2 * | 11/2004 | Collot et al. ............... 73/170.02 |
| 7,000,871 | B2 * | 2/2006 | Barre et al. ................ 244/134 F |
| 7,124,630 | B2 * | 10/2006 | Hanson et al. ............. 73/170.02 |
| 7,334,471 | B2 * | 2/2008 | Maatuk ...................... 73/304 R |
| 7,370,525 | B1 * | 5/2008 | Zhao et al. ................ 73/170.17 |
| 7,597,018 | B2 * | 10/2009 | Braun et al. ................. 73/866.5 |
| 8,037,750 | B2 * | 10/2011 | Heuer et al. .............. 73/170.26 |

FOREIGN PATENT DOCUMENTS

| EP | 0100715 A1 | 2/1984 |
| FR | 2787885 A1 | 6/2000 |

* cited by examiner

*Primary Examiner* — Lisa Caputo
*Assistant Examiner* — Jermaine Jenkins
(74) *Attorney, Agent, or Firm* — Baker & Hostetler, LLP

(57) ABSTRACT

The invention relates to an aeronautical probe designed to be mounted on the skin of an aircraft and comprising a probe body protruding from the skin of the aircraft and a heater for de-icing an external surface of the probe body. According to the invention, the heater comprises two self-supporting electrodes and heating resistive elements. Each electrode is formed of an electrically insulating substrate and of an electrically active portion forming one face of the electrode in question. Each resistive element is in contact with the faces of the electrodes. The notable advantages of the invention are that it makes it possible to reduce the operating temperature of the resistive elements and the phenomena of fatigue in the mechanical link between the electrodes and the resistive elements due to different expansion coefficients.

16 Claims, 2 Drawing Sheets

AERONAUTICAL PROBE WITH INTEGRATED HEATER

CROSS-REFERENCE TO RELATED APPLICATIONS

This application is a National Stage of International Patent Application No. PCT/EP2008/066446, filed on Nov. 28, 2008, which claims priority to foreign Patent Application No. FR 07 08398, filed on Nov. 30, 2007, the disclosures of which are incorporated herein by reference in their entirety.

FIELD OF THE INVENTION

The present invention relates to an aeronautical probe with integrated heater. It relates more particularly to a wind vane, for measuring the orientation of the wind, with an integrated heater. Such a wind vane finds a particular use in the aeronautical industry, where it provides information on the orientation of the incident air flow relative to an aircraft, called the relative wind. In this context, the wind vane is more commonly called a pitch vane. The wind vane according to the invention may nevertheless be used in other fields, in particular in meteorology, notably in extreme conditions of temperature and humidity

BACKGROUND OF THE INVENTION

Knowing the orientation of the relative wind is necessary for piloting an aircraft. This knowledge makes it possible to compute an incidence parameter, from which flows the computation of a critical parameter: the lift. Knowing the lift of the aircraft, at every moment during the flight, is absolutely necessary to the safety of the flight. This knowledge is provided partly by a wind vane. The wind vane is an element attached to the skin of the aircraft. It comprises a rotating base and a profiled plate that is oriented in the direction of the wind. The rotating base and the plate are connected by a join. They are for example made of metal alloy. The wind vane is connected so as to pivot about an axis orthogonal to a plane tangential to the skin of the aircraft. Like any aeronautical probe, the wind vane, and in particular its plate, must be heated in order to withstand the icing conditions encountered during flights. Icing deforms the calibrated outer surface of the plate, unbalancing it, and therefore falsifying the measurement of the orientation of the relative wind and consequently the computation of lift associated with this orientation.

In order to ensure the de-icing of the wind vane, an elongated heating element, called a heater, is placed inside the wind vane. This heater, from the inside of the wind vane, heats the outer surfaces of the wind vane. The heater can be inserted either via a trailing edge of the plate, or via the rotating base of the wind vane. The heater comprises ceramic blocks forming a heating resistor. The blocks are surrounded by two conductive plates forming electrodes for the heater. The conductive plates are installed, brazed or bonded to the ceramic blocks. For safety reasons, the outer surface of the wind vane must not be subjected to an electric potential. The ceramic blocks and the conductive plates are consequently electrically insulated from the plate and the rotating base by a polymer or resin coating or by an electrically insulating film.

Such an electrical insulation of the ceramic blocks and of the conductive plates has several drawbacks. A first drawback is that this electric insulation also forms a heat barrier between the heating ceramic blocks and the plate of the wind vane. To compensate for this loss of heat energy transmission, the ceramic blocks must operate at very high temperatures. These high temperatures impose design constraints, notably in the choice of the polymer, of the resin or of the insulating film which must withstand these temperatures, and in the mechanical connection between the conductive plates and the ceramic blocks. These high temperatures also involve a considerable electricity consumption and, in certain cases, a premature aging of the ceramic blocks.

One drawback, associated with the use of a polymer or resin coating, is that this coating is secured to the ceramic blocks and the conductive plates, while the materials forming these various elements have very different expansion coefficients. These differences cause stresses in the mechanical connections between the polymer or resin coating and the ceramic blocks. These stresses become greater as the operating temperatures rise. The result of this is a fatigue phenomenon that is due to the sequence of thermal cycles and is capable of culminating in the breakage of the mechanical connections. In the event of breakage, even partial, the electric insulation may fail, the outer surface of the wind vane consequently being subjected to an electric potential. Similarly, the connection by installing, brazing or bonding between the conductive plates and the ceramic blocks is subjected to stresses due to the differential expansion that can result in the breakage of the electric connection between the conductive plates and the ceramic blocks. Such a breakage prevents the heating and therefore the de-icing of the wind vane. The computation of the incidence and consequently of the lift is then falsified.

Another drawback, still associated with the use of a polymer or resin coating, is that this coating must be applied uniformly; otherwise there is the risk that electrical contacts will occur between the electrodes and the plate. The uniformity of the coating is dependent on many parameters, in particular on the composition and the temperature of the coating when it is applied.

Another drawback of the electrically insulating film is that, although in principle it has a uniform thickness, there is the risk that it is damaged when the heater is inserted into the plate. The plate can then be subjected to an electric potential.

SUMMARY OF THE INVENTION

One object of the invention is notably to alleviate some or all of the aforementioned drawbacks. Accordingly, the subject of the invention is an aeronautical probe designed to be mounted on the skin of an aircraft and comprising a probe body protruding from the skin of the aircraft and a heater for de-icing an outer surface of the probe body. According to the invention, the heater comprises two self-supporting electrodes and heating resistive elements, each electrode being formed of an electrically insulating substrate and an electrically active portion forming one face of the electrode in question, each resistive element being in contact with the faces of the electrodes.

The invention has several advantages. A first advantage is the possibility of using an electric insulation, in this instance substrates, with a thermal expansion coefficient that is substantially equal to the thermal expansion coefficient of the resistive elements. The appropriate choice of the material of the substrates, for example of the ceramic, makes it possible to reduce, or even eliminate, the phenomena of fatigue in the mechanical connections between the resistive elements and the electrodes. In particular, the resistive elements and the electrodes may be rigidly connected over the whole of their contact surface, which improves the heat conduction and the electric conduction.

A second advantage is the better thermal conductivity of the substrates. In particular, the substrates can be ceramic elements. The thermal conductivity of ceramic materials is of the order of ten times greater than that of organic products. The heat is therefore better dissipated from the resistive elements to the probe body. In other words, the thermal efficiency is better. The result of this is a reduction in the operating temperature of the resistive elements. This temperature reduction saves electric power, reduces the stresses in the mechanical connection between the electrodes and the resistive elements and increases the possibilities of connection between the electrodes and the resistive elements. The effect of all these points is to increase the reliability of the wind vane.

A third advantage is the production of a firm electric insulation between the resistive elements and the probe body. The risk of short circuit, for example by perforation of the insulating film, is thus eliminated. The reliability of electrical insulation then does not depend very much on the manufacturing process. It is based essentially on the design. Moreover, the electrodes can be produced with very high dimensional constraints. The heater can therefore be inserted into the probe body with a tight adjustment, limiting the risks of dissymmetry of heating of the probe body.

BRIEF DESCRIPTION OF THE DRAWINGS

The invention will be better understood and other advantages will appear on reading the detailed description of an embodiment given as an example, the description being made with respect to appended drawings which represent.

DETAILED DESCRIPTION

The rest of the description is made with reference to a wind vane for measuring the orientation of the wind. However, the invention applies just as well to any aeronautical probe designed to be mounted on the skin of an aircraft, such as a pressure probe or a temperature probe.

Figure 1:
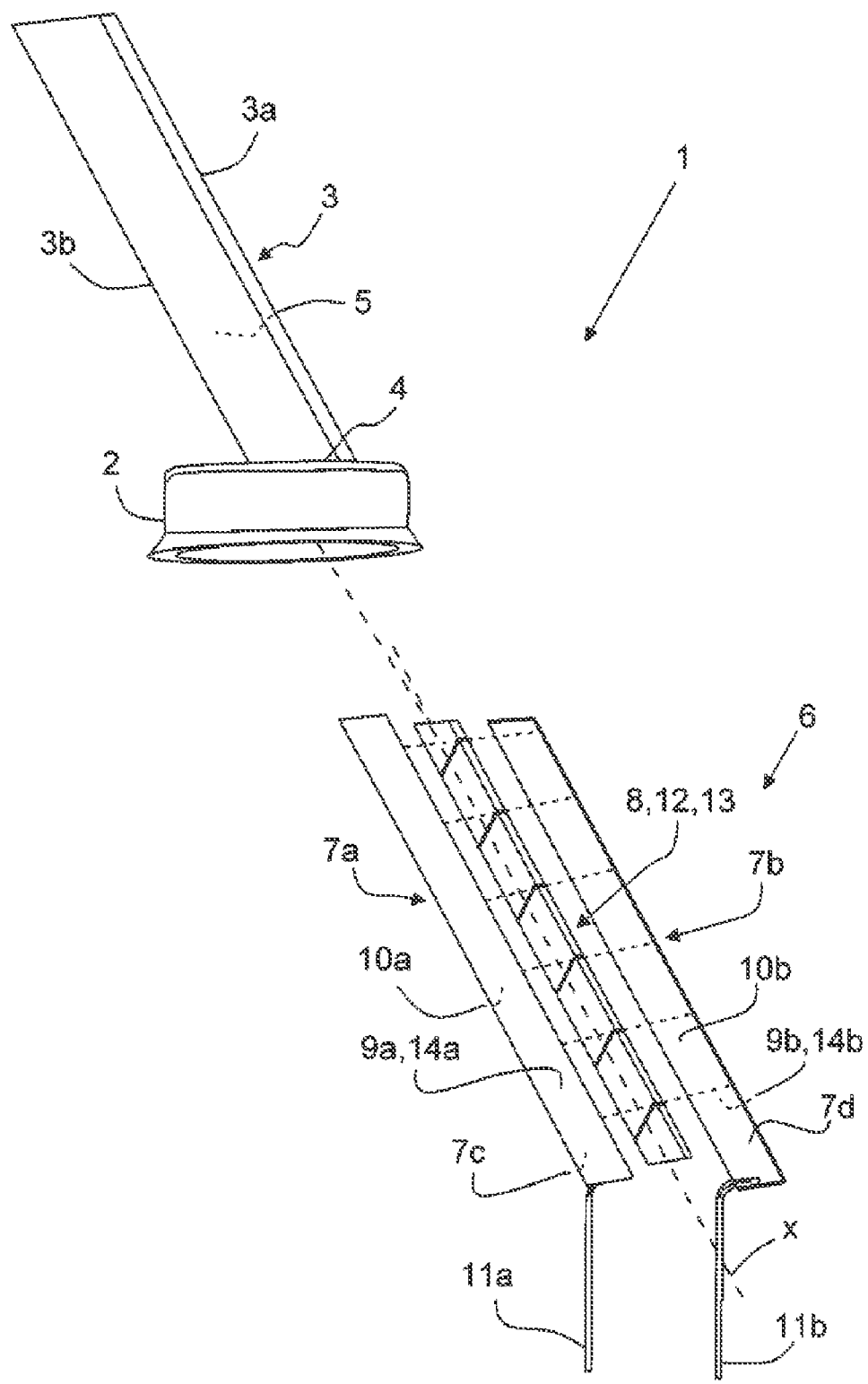
FIG. 1, an exploded view of a probe according to the invention.
Figure 2:
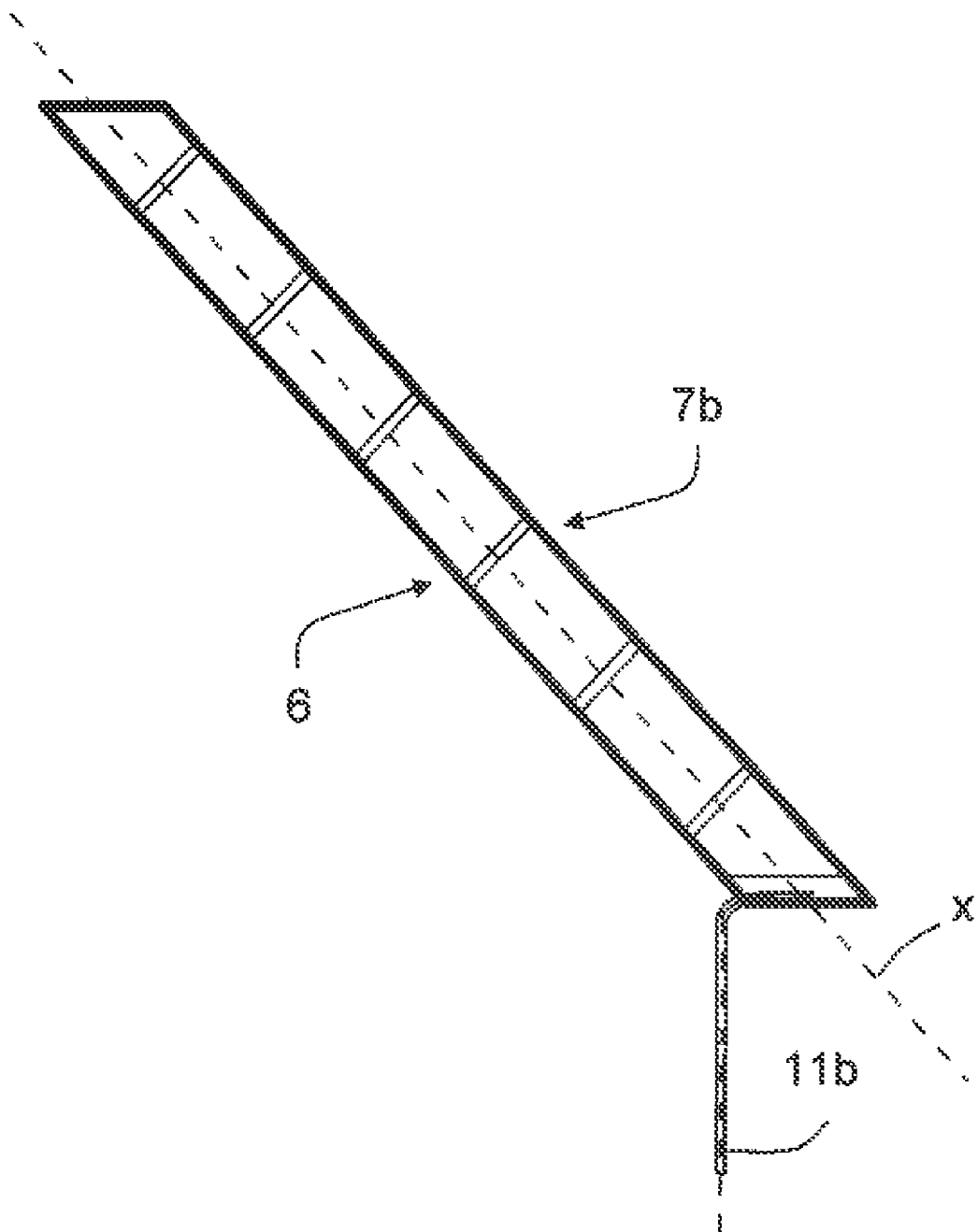
FIG. 2, a view in section of a probe heater according to the invention.

FIG. 1 shows a wind vane 1 for measuring the orientation of the wind according to the invention, designed to be mounted on the skin of an aircraft. The wind vane 1 comprises a rotating base 2 and a plate 3 attached to the rotating base 2 by a join 4. The plate 3 is for example welded to the rotating base 2. The rotating base 2 and the plate 3 are oriented in the direction of the wind and form, with the join 4, a body of the probe. This probe body protrudes from the skin of the aircraft. The rotating base 2 and the plate 3 are for example made of metal alloy. The plate 3 comprises a leading edge 3a allowing the plate 3 to penetrate the air and a trailing edge 3b. It also comprises a cavity 5 into which a heater 6 can be inserted making it possible to de-ice an outer surface of the wind vane 1, notably the outer surface of the plate 3. The heater 6 can be inserted either through the trailing edge 3b or through the rotating base 2. In the latter case, the rotating base 2 comprises an opening connected to the cavity 5 allowing the heater 6 to pass through. The heater 6 comprises two self-supporting electrodes 7a and 7b and heating resistive elements 8. Each electrode 7a and 7b is formed of an electrically insulating substrate 9a or 9b and of an electrically active portion 10a or 10b. The electrodes 7a and 7b thus perform both the function of an electrode and the function of insulation of these electrodes. The substrate 9a or 9b is rigid so as to make the electrodes 7a and 7b self-supporting. The active portions 10a and 10b form respectively a face 7c and 7d for the electrodes 7a and 7b respectively. They are for example a metallic deposit made on the substrates 9a and 9b. The resistive elements 8 are in contact with the faces 7c and 7d of the electrodes 7a and 7b respectively. The electrodes 7a and 7b are for example electrically powered via electric wires 11a and 11b brazed onto the active portions 10a and 10b of the electrodes 7a and 7b.

The wind vane 1 according to the invention notably has the advantage that the elements of the wind vane 1 being able to be subjected to an electric potential are insulated from the plate 3 by the substrates 9a and 9b. The electric insulation is thus produced in a firm manner, the manufacturing process having little effect on the quality of this parameter.

According to a particular embodiment, the substrate 9a and 9b of each electrode 7a and 7b is a ceramic element. Since ceramics are a better thermal conductor than polymer or resin, the transfer of heat from the resistive elements 8 to the plate 3 is made easier. For one and the same temperature of the plate 3, the resistive elements 8 generate less heat. This reduced generation of heat has several consequences. A first consequence is a reduction in electricity consumption and/or a reduction in the dimensions of the resistive elements 8. In the aeronautical field, the reduction in electricity consumption and the reduction in space requirement are important design parameters. A second consequence is the widening of the possible choices in the connection between the resistive elements 8 and the electrodes 7a and 7b. A third consequence is the increase in the reliability of the wind vane 1, the thermal expansion stresses in the connection between the resistive elements 8 and the electrodes 7a and 7b reducing with the temperature.

In one particular embodiment, the resistive elements 8 are positive temperature coefficient (PTC) resistors 12. The PTC resistors are thermistors the resistance of which increases in a temperature range and reduces outside this range. The temperature range can be determined during the design of the resistors. According to the invention, the temperature range is determined so as to include the range of operating temperatures of the wind vane 1. The use of PTC resistors makes it easier to regulate the temperature of the wind vane 1. When the temperature reduces, the resistance also reduces. According to Ohm's law, for one and the same voltage applied to the terminals of the PTC resistors 12, the current increases. The result of this is an increase in the temperature of the PTC resistors 12. In certain cases, it is possible to completely regulate the temperature of the wind vane 1 using only PTC resistors 12.

In one particular embodiment, the resistive elements 8 are ceramic blocks 13. The use of ceramics for the resistive elements 8 makes it possible to reduce the difference between the expansion coefficient of the resistive elements 8 and that of the substrates 9a and 9b. Advantageously, the ceramic blocks 13 and the ceramic elements 9a and 9b have substantially equal thermal expansion coefficients. Substantially equal expansion coefficients means expansion coefficients such that, in the operating temperature range of the probe, the two elements are not sufficiently deformed relative to one another to cause a crack in one of the two elements or in the connection between these two elements. This equality of expansion coefficients removes the thermal expansion stresses in the connection between the ceramic blocks 13 and the ceramic elements 9a and 9b. This removal of the stresses increases the service life of the connection and hence of the wind vane 1.

In one particular embodiment, the resistive elements 8 are block-shaped. In particular, they may have a rectangular parallelepipedic shape. They are placed in parallel between the two electrodes 7a and 7b, for example along a line X. The choice of the shape and of the number of resistive elements 8 makes it possible to form a heater 6 that adapts to the cavity 5 of the plate 3.

Advantageously, the substrates 9a and 9b are ceramic plates 14a and 14b having, for example, a parallelepipedic shape.

Also advantageously, the electrically active portions 10a and 10b do not entirely cover the faces 7c and 7d of the electrodes 7a and 7b respectively, but a peripheral space is arranged in order to insulate the resistive elements 8 from the plate 3. The peripheral space may for example comprise a peripheral protuberance forming a reinforcement in which the resistive elements 8 are housed.

According to a first embodiment, the resistive elements 8 are brazed onto the faces 7c and 7d of the electrodes 7a and 7b.

According to a second embodiment, the resistive elements 8 are bonded to the faces 7c and 7d of the electrodes 7a and 7b with the aid of an electrically conductive adhesive.

Advantageously, the braze or the adhesive is chosen so that the assembly consisting of the electrodes 7a and 7b and of the resistive elements 8 withstands an infinity of temperature-variation cycles in operation. In other words, the stresses generated in the connection between the resistive elements 8 and the electrodes 7a and 7b because of the difference in thermal expansion coefficients can be applied an infinity of times without causing the connection to break. These stresses include stresses generated during the temperature variations normally observed in the course of the life of the wind vane 1 during the flights of the aircraft, from its take-off to its landing, and during the periods of taxiing and storage. The choice of the braze or of the adhesive makes it possible to increase the service life of the wind vane 1. Examples of adhesive are the silicone-based or epoxy-based adhesives laden with metal particles.

In one particular embodiment, the plate 3 comprises a casing forming the cavity 5 into which the heater 6 is inserted. The substrate 9a and 9b of the electrodes 7a and 7b is then in contact with the inner walls of the cavity 5, in this instance the inner walls of the plate 3. It may be easier to insert the heater 6 by applying an electrically insulating grease to the outer surface of the heater 6.

In another embodiment, the electrodes 7a and 7b form the plate 3 directly. In other words, the shape of the plate 3 is obtained directly from the shape of the electrodes 7a and 7b. This embodiment makes it possible to reduce the number of elements forming the wind vane 1 and consequently to increase its reliability.

The invention claimed is:

1. An aeronautical probe designed to be mounted on the skin of an aircraft and comprising a probe body protruding from the skin of the aircraft and a heater for de-icing an outer surface of the probe body, wherein the heater comprises two self-supporting electrodes and heating resistive elements, each electrode being formed of an electrically insulating substrate and of an electrically active portion forming one face of the electrode, each resistive element being in contact with the faces of the electrodes.

2. The probe according to claim 1, wherein the electrically active portions are a metallic deposit made on the substrates.

3. The probe according to claim 1, wherein the resistive elements are positive temperature coefficient resistors.

4. The probe according to claim 1, wherein the resistive elements are ceramic blocks.

5. The probe according to claim 4, wherein the ceramic blocks and the ceramic elements of the electrodes have substantially equal thermal expansion coefficients.

6. The probe according to claim 1, wherein the substrate of each electrode is a ceramic element.

7. The probe according to claim 6, wherein the ceramic blocks and the ceramic elements of the electrodes have substantially equal thermal expansion coefficients.

8. The probe according to claim 1, wherein the resistive elements have a parallelepipedic shape and in that they are placed in parallel between the two electrodes.

9. The probe according to claim 1, wherein the substrate of each electrode is a ceramic plate.

10. The probe according to claim 1, wherein the resistive elements are brazed onto the faces of the electrodes.

11. The probe according to claim 10, wherein the braze or the adhesive is chosen so that the assembly consisting of the electrodes and of the resistive elements withstands an infinity of temperature-variation cycles in operation.

12. The probe according to claim 1, wherein the resistive elements are bonded to the faces of the electrodes.

13. The probe according to claim 12, wherein the braze or the adhesive is chosen so that the assembly consisting of the electrodes and of the resistive elements withstands an infinity of temperature-variation cycles in operation.

14. The probe according to claim 1, wherein the probe body has a cavity, the heater being inserted into the cavity, the substrate of the electrodes being in contact with the inner walls of the cavity.

15. The probe according to claim 1, wherein the electrodes of the heater form the probe body.

16. The probe according to claim 1, wherein the probe is a wind vane for measuring the orientation of the wind and comprises a rotating base and a plate that is oriented in the direction of the wind and attached by a join to the rotating base, the heater being inserted into the plate.

* * * * *

UNITED STATES PATENT AND TRADEMARK OFFICE
CERTIFICATE OF CORRECTION

PATENT NO.       : 8,397,563 B2                              Page 1 of 1
APPLICATION NO.  : 12/745556
DATED            : March 19, 2013
INVENTOR(S)      : Pineau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

First Day of September, 2015

Michelle K. Lee
*Director of the United States Patent and Trademark Office*